Oct. 28, 1969   Q. A. HANSEN   3,474,887
LEVER OPERATED CLUTCH ACTUATOR
Filed July 11, 1967
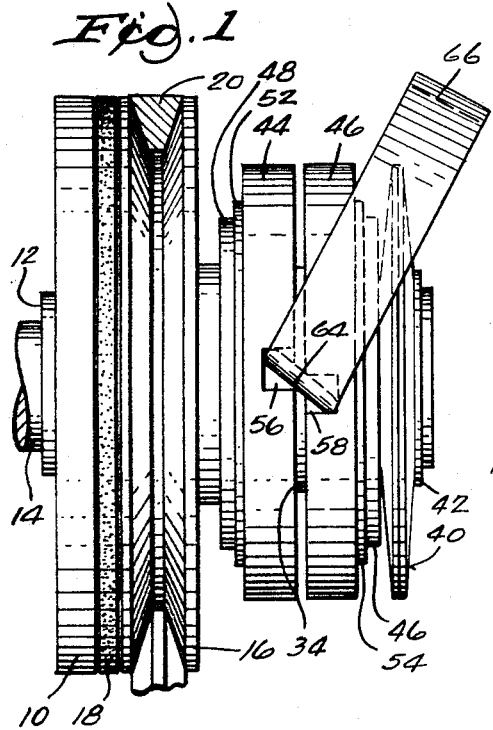
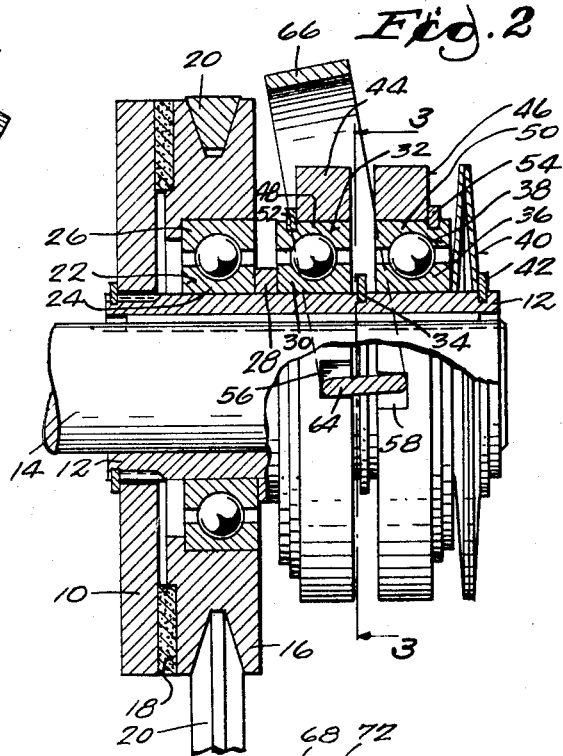
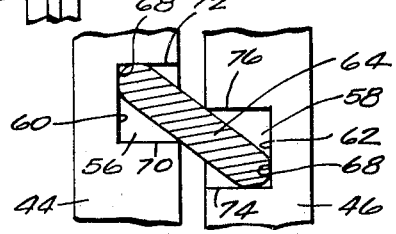
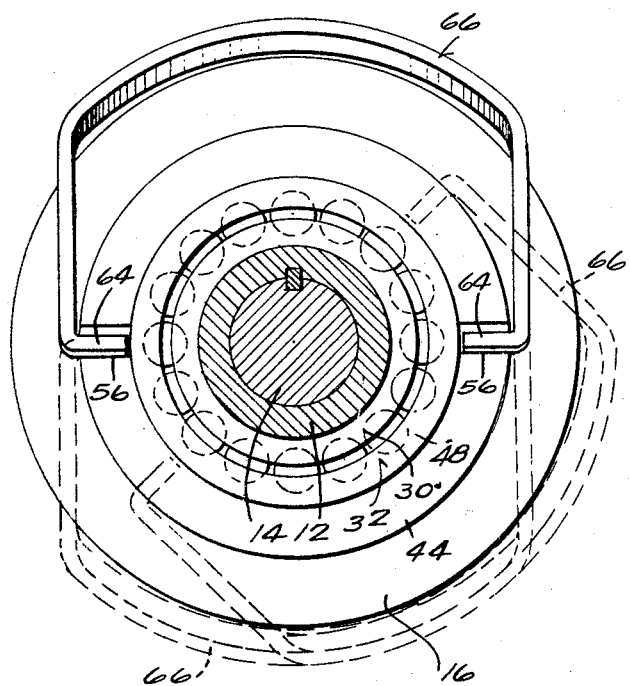
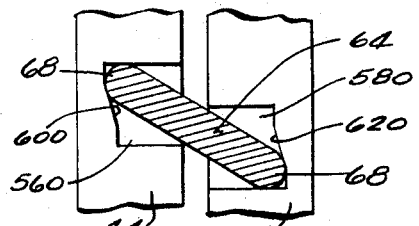
INVENTOR
QUINTEN A. HANSEN
BY Wheeler, Wheeler, House & Clemency
ATTORNEYS 3,474,887
LEVER OPERATED CLUTCH ACTUATOR
Quinten A. Hansen, 4338 Highway 38,
Franksville, Wis. 53126
Filed July 11, 1967, Ser. No. 652,615
Int. Cl. F16d *13/70;* F16h *21/52, 25/18*
U.S. Cl. 192—93           3 Claims

ABSTRACT OF THE DISCLOSURE

Coaxial anti-friction bearing races normally in proximity are notched to provide seats for the extremities of a yoke-shaped lever which, when oscillated in an axial plane, cams the bearing races apart. This forces one clutch element into engagement with another and compresses a spring which limits and defines the clutch-engaging pressure. Movement of the lever slightly over center causes it to retain the clutch engaging position until manually returned for clutch disengagement.

BACKGROUND OF THE INVENTION

As compared with the device of my prior Patent 3,127,969 which rotates ball cammed surfaces to effect clutch engagement and disengagement, the instant device involves no such rotation about the driving axis but accomplishes the result by movement in the direction of the axis. Since no rotation about the axis is involved, the instant device has the advantage of permitting the control yoke to be located at any point about the axis, thus making the clutch adaptable to a wide variety of uses. The construction of the instant device is also simpler and considerably less expensive than that of my prior patent.

SUMMARY OF THE INVENTION

A clutch of any desired type having axially engageable elements has its movable element subject to the axial thrust of the inner race of an anti-friction bearing. A second anti-friction bearing has an inner race which is also movable axially and is subject to the bias of a spring which holds the two anti-friction bearings in immediate proximity and in position defined by an interposed stop member carried by the shaft.

The outer races of the said bearings have axially opposed notches at diametrically opposite points to receive the inwardly turned cam portions of a yoke lever which spans the bearing assembly and is of such width as to extend across the spacer with its side margins disposed in opposing notches of the respective pairs of notches. This lever is pivotally movable in a plane which is coaxial with the races. When this yoke lever is in one position, the bearing assemblies are free of axial thrust and the clutch elements are disengaged. When the yoke member is oscillated in a plane which includes the shaft axis, the margins of its camming extremities coact with the notched rings of the bearing assemblies to cam such rings apart, thereby separating the bearing assemblies. One such assembly thereupon engages the clutch elements, the other compressing a spring. When the yoke lever reaches a position of full clutch engagement, it has moved slightly over center, thereby maintaining the bearing assemblies separated and holding the movable clutch element against the other clutch element, subject to the pressure of the spring compressed by the camming action.

BRIEF DESCRIPTION OF DRAWINGS

FIG. 1 shows a side elevation of a clutch embodying the invention.

FIG. 2 is a view partially in side elevation and partially in axial section showing the clutch lever in clutch engaging position.

FIG. 3 is an enlarged detail view taken in section on the line 3—3 of FIG. 2.

FIG. 4 is a fragmentary diagrammatic detail view showing the yoke lever camming extremity in section and the notched cam operated rings fragmentarily in elevation.

FIG. 5 is a view similar to FIG. 4 showing a slightly modified contour of the cam operated rings.

DESCRIPTION OF PREFERRED EMBODIMENT

The invention is not concerned with details of the clutch per se. As indicated in my former Patent 3,127,969, the invention is applicable either to a single disk or multiple disk clutch. For the purpose of illustrating the clutch actuator of the present invention, I have shown a single clutch element 10 fixed to a hub 12 which is keyed to the shaft 14 to be driven from a pulley 16. The pulley comprises the complementary clutch disk and preferably has facing at 18 for transmitting motion from the driving belt 20 through the clutch to the driven shaft 14. An anti-friction bearing 22 has its inner race 24 slideable axially upon the hub 12, its outer race 26 supporting the pulley 16.

For the purposes hereof the hub 12 may be regarded as comprising the driven shaft. In axial series along the hub 12 are spacers 28; the inner race 30 of a bearing 32; a locating stop ring 34; the inner race 36 of bearing 38; a Belleville spring 40; and a split ring 42 which serves as a seat for the spring.

Camming rings 44 and 46 are seated respectively on the outer races 48 and 50 of the bearings 32 and 48 and may be regarded as parts thereof. Snap rings 52 and 54 on the races 48 and 50 transmit axial thrust to the camming rings 44 and 46 when said races of the camming rings are forced apart as hereinafter described.

At diametrically opposite points, the camming rings 44 and 46 are provided with notches 56 and 58 slightly staggered circumferentially as shown in FIGS. 1 to 4. The bottoms of notches 56 and 58 are formed by camming surfaces 60 and 62 (FIG. 4) acted upon by the camming extremities 64 of the yoke-shaped lever 66. The side margins of the camming extremities are desirably rounded as shown at 68 in FIG. 4. The notches extend circumferentially between end surfaces 70 and 72 of ring 44 and 74 and 76 of ring 46. The offset of the notches is such that the circumferential distance between the surface 70 of notch 56 and the surface 76 of notch 58 is almost the same as the thickness of the actuating extremity 64 of the lever. In the position of lever 66 shown in FIG. 1 and FIG. 4, in which the clutch is disengaged, the camming extremities of the lever lie in the angle between the surfaces 60 and 72 of notch 56 and in the diametrically opposite angle between the surfaces 62 and 74 of notch 58. When the actuating lever is swung from the position of FIG. 1 to the position of FIG. 2, the camming extremities 64 thereof move across a central position in which the camming extremity is parallel to the shaft axis. The camming extremity 64 may be regarded as fulcrumed between the rings 44 and 46 to accommodate the swinging oscillation of the lever 66 between the clutch releasing position of FIG. 1 and the clutch engaging position of FIG. 2.

The inner race 30 of bearing 32 floats between the spacing collar 28 and the positioning stop ring 34, not being urged toward the stop ring unless the clutch is provided with a disengaging spring. However, the race 36 of bearing 38 is urged against the locating ring 34 by the bias of the Belleville spring 40. When the yoke lever is moved from the position of FIG. 1 to that of FIG. 2, the race 36 will normally be held against the locating ring 34 by the spring 40. This position will be maintained until the clutch element 16 is firmly seated against the clutch element 10 to transmit motion to shaft 14. Only when such engagement is achieved will there be a reaction pressure which will displace the race 36 and compress the biasing spring 40. Thus this spring will determine the amount of axial pressure between the clutch elements when these have been engaged by the camming action above described. The bias of the spring will also react to urge the floating ring 46 toward the displaced floating ring 44, thereby tending to clamp the intervening actuating extremities 64 of the yoke lever to hold the lever in the off center position in which it is shown in FIG. 2.

Accelerated camming action may be provided if desired by providing special camming surfaces 600 and 620 as shown in FIG. 5, the effect of these surfaces being to reduce the depth of the respective notches 560 and 580 in the portions of such surfaces into which the margins 68 of the camming extremities 64 move in the course of yoke lever oscillation. This will result in greater axial displacement of the rings 44, 46 with increased bias of spring 40 when the clutch is engaged.

It is one of the features of this device that the yoke lever 66 may be located in any desired angular position about the shaft, where its operation is most convenient. Since the respective rings 44 and 46 are freely rotatable about the outer races of the respective bearings 32 and 38, it will be evident that the yoke lever can be operated as well in one position as another. Different positions are indicated by full and dotted lines of FIG. 3.

The fact that the yoke lever moves in a generally axial direction to effect engagement and disengagement facilitates connection of the yoke levers of a number of such clutches to each other to be operated concurrently. For example, if the clutch of the present invention is so designed as to function as a brake, the actuator being identical to the actuator illustrated except that it is turned end for end, it is then possible to connect the yoke of the brake actuator directly to the yoke of the clutch actuator so that the brake is released as the clutch is engaged and vice versa. It is well-known that brakes can be regarded as clutches which connect the moving element with a fixed element. It has already been stated that the nature of the clutch is not a factor in the present invention. To change it to a brake, all that is required is to have the element 16 restrained against rotation so that its engagement axially with element 10 fixed to the shaft will result in braking rotation of the shaft. Such arrangements being common and the clutch being no part of the present invention, no illustration thereof is required.

What is claimed is:

1. In a clutch of the type in which elements relatively rotatable on a common axis are engaged axially by thrust developed by the separation of the axially spaced races of anti-friction bearings, the combination with such bearings having races with an intervening space, of means on the races of respective bearings providing opposing thrust surfaces, and an oscillatable yoke-shaped lever unitarily provided with a handle and with legs disposed at opposite sides of the respective races and movable in a plane including said axis from a retracted position to an advanced position, the respective legs having fulcrum extremities spanning the space between the races in a direction oblique to said axis when said lever is in its retracted position and provided with respective fulcrum portions elongated axially and of greater extent than the normal distance in said direction between said surfaces, and operatively bearing directly on the opposing thrust surfaces of said races, said fulcrum portions being wholly dependent on said surfaces for determining the fulcrum of said lever and being adapted in the oscillation of said lever to its advanced position to move toward parallelism with said axis and thereby to wedge apart the surfaces with which said fulcrum portions are engaged, and said means providing opposing thrust surfaces having oppositely directed notches which are circumferentially offset and in which the fulcrum extremities of the respective legs are engaged.

2. A clutch according to claim 1 in which the extent of the notches controls the extremes of movement of the lever between its retracted and advanced positions aforesaid, the terminal end surfaces of the notches being spaced circumferentially by a distance not substantially exceeding the thickness of said fulcrum extremities, the range of movement permitted to said lever between said positions being just sufficient to permit said lever to move across a position of parallelism with said axis.

3. A clutch according to claim 2 in which the notches have varying depth determined by surfaces of the respective races engaged by margins of the fulcrum extremities of said legs in the course of movement of said lever between said positions.

References Cited

UNITED STATES PATENTS

| | | |
|---|---|---|
| 249,325 | 11/1881 | Edwards. |
| 1,279,243 | 9/1918 | Bruce et al. _____ 192—70.24 |
| 2,537,403 | 1/1951 | Gahagan _____ 192—70.23 X |
| 1,039,495 | 9/1912 | Daimler _____ 192—93 X |
| 1,464,251 | 8/1923 | Starkey. |
| 2,897,935 | 8/1959 | Croft. |
| 3,127,969 | 4/1964 | Hansen. |
| 3,270,842 | 9/1966 | Pinto. |
| 3,372,782 | 3/1968 | Nieland. |

BENJAMIN W. WYCHE III, Primary Examiner

U.S. Cl. X.R.

74—107; 192—110